United States Patent [19]

Komiyama et al.

[11] Patent Number: 4,648,507

[45] Date of Patent: Mar. 10, 1987

[54] MAGNETIC TAPE CASSETTE STORAGE CASE

[75] Inventors: Choji Komiyama; Kengo Oishi, both of Kanagawa, Japan

[73] Assignee: Fuji Photo Film Co., Ltd., Kanagawa, Japan

[21] Appl. No.: 720,243

[22] Filed: Apr. 5, 1985

[30] Foreign Application Priority Data

Apr. 6, 1984 [JP] Japan .................. 59-50297[U]

[51] Int. Cl.⁴ .................................. B65D 85/672
[52] U.S. Cl. .......................... 206/232; 206/387
[58] Field of Search .................. 206/387, 232, 493

[56] References Cited

U.S. PATENT DOCUMENTS

| | | | |
|---|---|---|---|
| 3,747,745 | 7/1973 | Esashi et al. | 206/387 |
| 4,046,255 | 9/1977 | Ackeret | 206/387 |
| 4,230,225 | 10/1980 | Okada et al. | 206/387 |
| 4,354,597 | 10/1982 | Garrod | 206/387 |
| 4,401,220 | 8/1983 | Kim | 206/387 |

FOREIGN PATENT DOCUMENTS

| | | | |
|---|---|---|---|
| 0854022 | 10/1970 | Canada | 206/387 |
| 2079726 | 1/1982 | United Kingdom | 206/387 |

*Primary Examiner*—William Price
*Assistant Examiner*—Jimmy G. Foster
*Attorney, Agent, or Firm*—Sughrue, Mion, Zinn, Mackpeak, and Seas

[57] ABSTRACT

In a magnetic tape cassette storage case having a casing and a cover to close and open the casing, recesses are formed in the inner surfaces of the cover and the bottom of the casing to receive a magnetic tape cassette's thicker portion which forms an opening in the front wall of the cassette.

1 Claim, 2 Drawing Figures

MAGNETIC TAPE CASSETTE STORAGE CASE

BACKGROUND OF THE INVENTION

The present invention relates to magnetic tape cassette storage cases, and more particularly to an improved magnetic tape cassette storage case of the type used to store an audio-type magnetic tape.

In general, a magnetic tape cassette used in an audio device or the like is stored in a cassette case made of plastic when not in use. A magnetic tape cassette has an opening into which the magnetic head, etc., of a magnetic tape recording and reproducing device are inserted, and includes a magnetic tape passing across the opening. The storage case is used to prevent the entrance of dust into the cassette through the opening, to protect the magnetic tape at the opening, and to protect the cassette as a whole.

The basic construction of a conventional magnetic tape cassette storage case is shown in FIG. 1. The case 1 includes a cover 2 with a pocket 4 into which a magnetic tape cassette 20 can be received, and a casing 5 having a pair of rotation preventing protrusions 7 which are inserted into the shaft insertion holes 22 of the magnetic tape cassette 20. The casing 5 has a pair of supporting shafts which extend from the inner surfaces of the right and left side walls thereof. The supporting shafts are engaged with a pair of through-holes formed in the right and left side walls of the pocket 4 so that the cover 2 can be swung like a door to close the casing 5.

The storage case 1 is formed so that the distance between the walls 3 and 6, which confront the front and rear surfaces of the magnetic tape cassette 20, respectively, corresponds to the thickness of the thicker portion 21 of the magnetic tape cassette 20. Accordingly, the thickness $l_1$ of the storage case 1 must be much larger than the thickness $l_2$ of the remaining portion of the cassette 20. Therefore, the space occupied by the storage case 1 is much larger than the space occupied by the magnetic tape cassette alone.

For this reason, to reduce the amount of space needed for storage (such as in an automobile), the user may not put the magnetic tape cassettes in the storage cases 1. However, if magnetic tape cassettes are stored without being encased, dust can readily accumulate inside the cassettes, adversely affecting the recording and reproducing characteristics of the cassettes.

SUMMARY OF THE INVENTION

In view of the foregoing, an object of the invention is to provide a magnetic tape cassette storage case which occupies a smaller space in storage than a conventional magnetic tape cassette storage case.

The foregoing object and other objects of the invention have been achieved by the provision of a magnetic tape cassette storage case comprising a casing and a cover pivotally coupled to the casing so that the casing can be closed and opened by swinging the cover, in which, according to the invention, the walls of the cover and casing which confront the front and rear surfaces of a magnetic tape cassette are provided with recesses for receiving a cassette's thicker portion which forms an opening in the front wall of the magnetic tape cassette, and the distance between the walls is only slightly greater than the thickness of the major portion of the magnetic tape cassette (other than the cassette's thicker portion).

The nature, principle and utility of the invention will become more apparent from the following detailed description when read in conjunction with the accompanying drawings.

DESCRIPTION OF THE PREFERRED EMBODIMENTS

Figure 1:
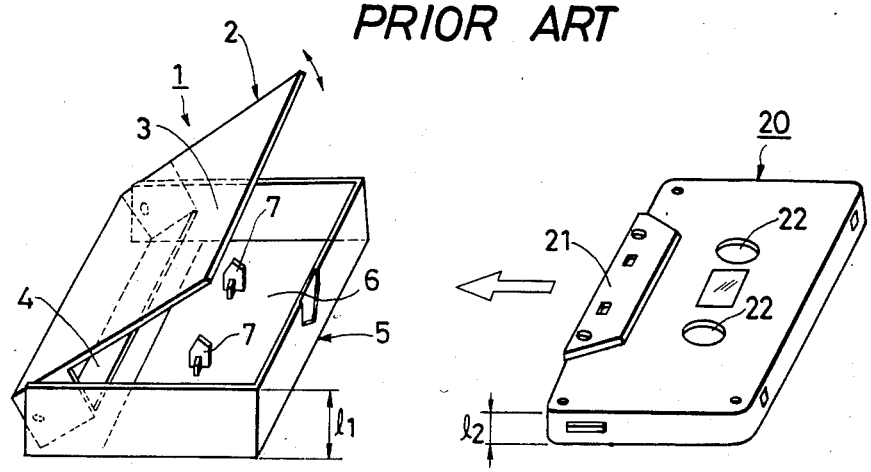
FIG. 1 is a perspective view showing a conventional magnetic tape cassette storage case.
Figure 2:
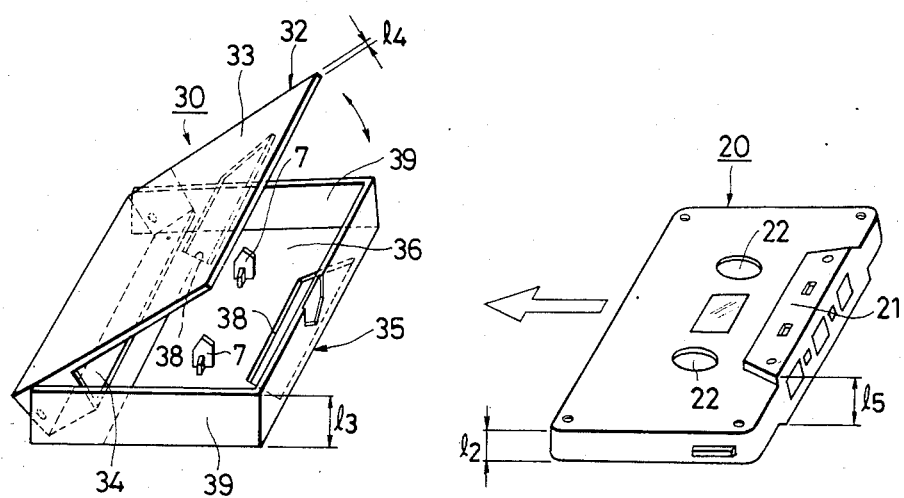
FIG. 2 is a perspective view showing an example of a magnetic tape cassette storage case according to the invention.

As shown in FIG. 2, a magnetic tape cassette storage case 30 of the invention includes a cover 32 with a pocket 34 and a casing 35 to which the cover is pivotally coupled, similarly to the above-described conventional storage case 1. The body of the cover 32, namely, a wall 33 confronting the front or rear surface of a magnetic tape cassette 20, has a recess 38 which receives the cassette's thicker portion 20 which forms the opening of the magnetic tape cassette 20. Another recess 38 for receiving the cassette's thicker portion 21 is formed in the bottom, or a wall 36, of the casing 35, and a pair of rotation preventing protrusions 7, similar to those of the conventional receiving case 1, are provided on the wall 36 of the casing 35.

The two recesses 38 are formed in the inner surfaces of the case at positions confronting each other. Each recess is shaped so as to be able to receive the cassette's thicker portion 21; specifically, each recess has a configuration which spreads outwardly with respect to the rotational axis around which the cover 32 is swung when the casing is closed or opened, for instance, in a trapezoidal shape.

The storage case 30 is designed so that, when it is closed, the wall 36 of the casing 35 is flush with the small wall of the pocket 34 which is parallel to the wall 33. Engaging parts are provided on the confronting surfaces of the right walls 39 of the casing 35 and the pocket 34, and similarly engaging parts are provided on the confronting surfaces of the left walls 39 of the casing and the pocket 34 which engage with each other when the casing 35 is closed by the cover 33 so that the case 30 will not unintentionally be opened during storage.

When the storage case 30 is closed, the distance between the walls 33 and 36 is only slightly greater than the thickness $l_2$ of the major portion of the magnetic tape cassette 20 (which is other than the cassette's thicker portion 21), and the distance between the two recesses 38 is only slightly larger than the thickness $l_5$ of the cassette's thicker portion 21.

The material of the storage case 30 may be the same as that of the conventional storage case and is not particularly limited. All that is required for the wall thickness $l_4$ of the storage case 30 is to provide sufficient protection for the magnetic tape cassette during storage, and for this purpose, it may be equal to that of the conventional case.

The wall thickness of the recesses 38 is smaller than the wall thickness $l_4$ of the other portions of the case. Therefore, it may be desirable to reinforce the walls of the recesses 38 by adhering thin plastic resin labels on the outer surfaces thereof.

In order to place a magnetic tape cassette 20 in the storage case 30 thus constructed, the case 30 is opened and the rear half of the magnetic tape cassette 20 (which is opposite the opening of the cassette 20) is inserted into the pocket 34. In this operation, one side of the cassette's thicker portion 21 is engaged with the recess 38 in the cover 32. When the cover 32 is swung to close the casing 35, the other side of the cassette's thicker portion 21 is engaged with the recess 38 in the bottom of the casing 32 while the rotation preventing protrusions 7 are inserted into the shaft insert holes 22. Thus, the magnetic tape cassette 20 has been firmly held in the case 30 for storage.

As is apparent from the above description, in the cassette storage case of the invention, due to the presence of the recesses 38 formed in the walls 33 and 36 which receive the cassette's thicker portion 21, the distance between the walls 33 and 36 is minimized. Therefore, the dimension, in the direction of the thickness of the cassette, of the storage case 30 is smaller than that of the conventional storage case, and therefore the space required for storing the cases 30 of the invention is smaller than the space required for storing the same number of conventional cases.

We claim:

1. In a magnetic tape cassette storage case comprising a casing and a cover pivotally coupled to said casing so that said casing can be closed and opened by said cover and a magnetic tape cassette can be inserted in said storage case, said magnetic tape cassette being of a type having a thicker portion in which is formed an opening in a front wall of said magnetic tape cassette, the improvement wherein:

said cover and casing comprising walls constructed to confront front and rear surfaces of said magnetic tape cassette, said walls having recesses for receiving said thicker portion of said magnetic tape cassette in which the thickness of each of said walls is reduced, the a distance between said walls being only slightly larger than a thickness of portions of said magnetic tape cassette other than said thicker portion, wherein said storage case further comprises means for reinforcing portions of said cover and casing walls in an area of said recesses, said reinforcing means comprising a plurality of thin plastic resin labels.

* * * * *